US010670832B2

(12) United States Patent
Mori

(10) Patent No.: US 10,670,832 B2
(45) Date of Patent: Jun. 2, 2020

(54) ZOOM LENS AND IMAGE PICKUP APPARATUS INCLUDING THE SAME

(71) Applicant: CANON KABUSHIKI KAISHA, Tokyo (JP)

(72) Inventor: Takeo Mori, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 70 days.

(21) Appl. No.: 15/991,182

(22) Filed: May 29, 2018

(65) Prior Publication Data

US 2018/0348478 A1 Dec. 6, 2018

(30) Foreign Application Priority Data

Jun. 2, 2017 (JP) .................. 2017-109743

(51) Int. Cl.
G02B 9/60 (2006.01)
G02B 13/02 (2006.01)
(Continued)

(52) U.S. Cl.
CPC ............ G02B 9/60 (2013.01); G02B 7/10 (2013.01); G02B 13/02 (2013.01); H04N 5/23238 (2013.01)

(58) Field of Classification Search
CPC . G02B 9/62; G02B 9/60; G02B 15/14; G02B 7/10; G02B 13/02; G02B 27/64;
(Continued)

(56) References Cited

U.S. PATENT DOCUMENTS 7,126,758 B2 * 10/2006 Fujimoto ............. G02B 15/173
359/676
7,848,028 B2 * 12/2010 Ohtake ................ G02B 15/173
359/676
(Continued)

FOREIGN PATENT DOCUMENTS

JP 2014006354 A 1/2014
JP 2014016601 A 1/2014
(Continued)

OTHER PUBLICATIONS

Notice of Reasons for Refusal issued by the Japanese Patent Office dated Apr. 16, 2019 in corresponding Japanese Patent Application No. 2017-109743, with English translation.

Primary Examiner — Jie Lei
(74) Attorney, Agent, or Firm — Carter, DeLuca & Farrell LLP

(57) ABSTRACT

Provided is a zoom lens including, in order from an object side to an image side: a first lens unit having a positive refractive power; a second lens unit having a negative refractive power; a third lens unit having a positive refractive power; a fourth lens unit having a negative refractive power; a fifth lens unit having a negative refractive power; and a sixth lens unit having a positive refractive power, wherein an interval between adjacent lens units is changed during zooming, wherein the first lens unit is configured to move toward the object side during zooming from a wide angle end to a telephoto end, and wherein a focal length of the first lens unit, a focal length of the sixth lens unit, and a back focus at the wide angle end are appropriately set.

7 Claims, 9 Drawing Sheets

(51) Int. Cl.
*G02B 7/10* (2006.01)
*H04N 5/232* (2006.01)

(58) Field of Classification Search
CPC .... G02B 27/646; G02B 15/173; H04N 5/232; H04N 5/23238; H04N 5/225
USPC ....... 359/714, 713, 752, 756, 757, 684, 683, 359/676, 557
See application file for complete search history.

(56) References Cited

U.S. PATENT DOCUMENTS

| | | | |
|---|---|---|---|
| 9,829,681 | B2 | 11/2017 | Mori |
| 2012/0050603 | A1 | 3/2012 | Imaoka et al. |
| 2013/0148005 | A1* | 6/2013 | Imaoka ................ G02B 15/173 348/340 |
| 2015/0237242 | A1* | 8/2015 | Imaoka ................ H04N 5/2254 348/373 |
| 2015/0338620 | A1 | 11/2015 | Iwasawa |

FOREIGN PATENT DOCUMENTS

| | | |
|---|---|---|
| JP | 2014228711 A | 12/2014 |
| JP | 2015049428 A | 3/2015 |
| JP | 2016051138 A | 4/2016 |
| JP | 06064217 B2 | 1/2017 |

\* cited by examiner

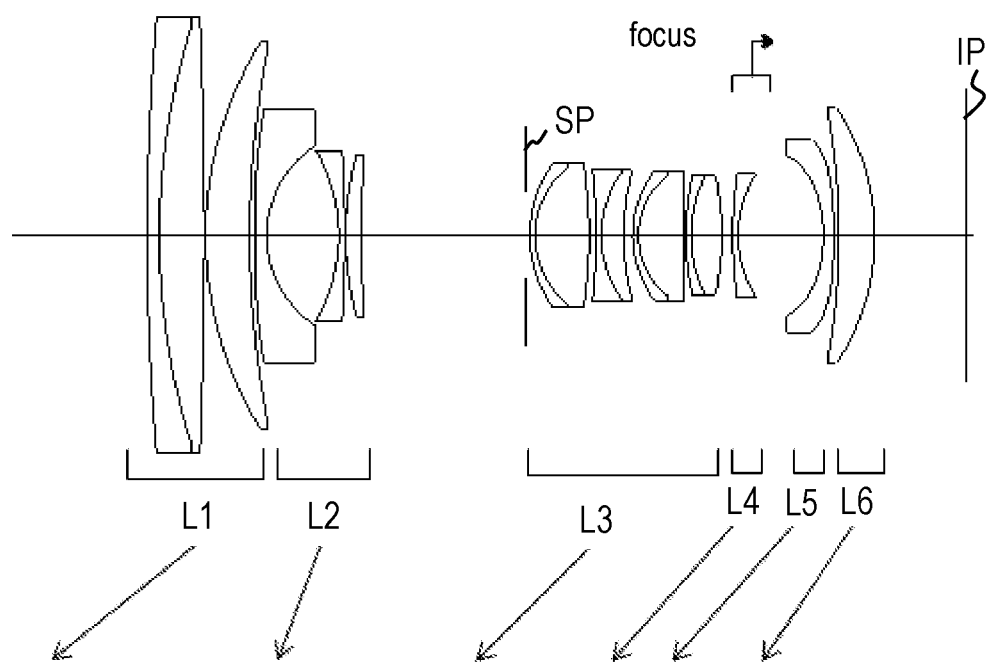

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens.

Description of the Related Art

In recent years, an image pickup optical system used in an image pickup apparatus has been required to be a small-sized zoom lens having high optical performance over the entire zoom range with a wide angle of view, a large aperture ratio, and further, a high zoom ratio (magnification varying ratio).

In general, as the zoom lens is more reduced in size, various aberrations occur more frequently, with the result that the optical performance is deteriorated. For example, in a standard zoom lens, retrofocus-type power arrangement is made at a wide angle end, and as the total lens length is reduced more, distortion and lateral chromatic aberration are generated more greatly. Further, aberration variation caused by zooming increases, and it thus becomes difficult to obtain satisfactory optical performance over the entire zoom range.

In view of the above, there has been proposed a zoom lens in which the retrofocus-type refractive power arrangement at the wide angle end is relaxed to reduce the length of a back focus so that high optical performance is obtained while the zoom lens is reduced in size (U.S. Patent Application Publication No. 2015/0338620). In U.S. Patent Application Publication No. 2015/0338620, there is disclosed a zoom lens including, in order from an object side to an image side, a first lens unit to a fifth lens unit having positive, negative, positive, negative, and negative refractive powers, in which an interval between adjacent lens units is changed during zooming. In U.S. Patent Application Publication No. 2015/0338620, there is disclosed the zoom lens in which the fourth lens unit is moved to perform focusing.

Further, there has been proposed a zoom lens in which a focus lens unit is reduced in size and weight so that rapid focusing is performed at a high zoom ratio while the zoom lens is reduced in size (U.S. Patent Application Publication No. 2012/0050603). In U.S. Patent Application Publication No. 2012/0050603, there is disclosed a zoom lens including, in order from an object side to an image side, a first lens unit having a positive refractive power, a second lens unit having a negative refractive power, a third lens unit having a positive refractive power, a fourth lens unit having a negative refractive power, a fifth lens unit having a negative refractive power, and a sixth lens unit having a positive refractive power, in which an interval between adjacent lens units is changed during zooming.

In U.S. Patent Application Publication No. 2012/0050603, there is disclosed the zoom lens in which the fourth lens unit is moved to perform focusing.

In the zoom lens, in order to obtain high optical performance over the entire zoom range and the entire object distance at a high zoom ratio while reducing the size of the zoom lens, it is important to appropriately set each element forming the zoom lens. For example, it is important to appropriately set a zoom type (the number of lens units and a refractive power of each lens unit) and a length of a back focus, and appropriately select a focusing lens unit. In particular, in order to obtain high optical performance over the entire zoom range while reducing the size of the zoom lens, it is important to satisfactorily correct, for example, chromatic aberration, field curvature, and distortion among various aberrations.

SUMMARY OF THE INVENTION

According to one embodiment of the present invention, there is provided a zoom lens including, in order from an object side to an image side: a first lens unit having a positive refractive power; a second lens unit having a negative refractive power; a third lens unit having a positive refractive power; a fourth lens unit having a negative refractive power; a fifth lens unit having a negative refractive power; and a sixth lens unit having a positive refractive power, wherein an interval between adjacent lens units is changed during zooming, wherein the first lens unit is configured to move toward the object side during zooming from a wide angle end to a telephoto end, and wherein the following conditional expressions are satisfied:

$$1.0 < f1/f6 < 1.9; \text{ and}$$

$$4.0 < f1/Skw < 15.0,$$

where f1 represents a focal length of the first lens unit, f6 represents a focal length of the sixth lens unit, and Skw represents a back focus at the wide angle end.

Further features of the present invention will become apparent from the following description of exemplary embodiments with reference to the attached drawings.

BRIEF DESCRIPTION OF THE DRAWINGS

FIG. 3 is a cross-sectional view of a zoom lens of Example 2 of the present invention at a wide angle end when an object at infinity is in focus.

DESCRIPTION OF THE EMBODIMENTS

Preferred embodiments of the present invention will now be described in detail in accordance with the accompanying drawings.

Now, exemplary embodiments of the present invention are described with reference to the attached drawings. A zoom lens according to one embodiment of the present invention includes, in order from an object side to an image side: a first lens unit having a positive refractive power; a second lens unit having a negative refractive power; a third lens unit having a positive refractive power; a fourth lens unit having a negative refractive power; a fifth lens unit having a negative refractive power; and a sixth lens unit having a positive refractive power. An interval between adjacent lens units is changed during zooming. The first lens unit is configured to move toward the object side during zooming from a wide angle end to a telephoto end. The second lens unit is configured to move toward the object side or the fourth lens unit is configured to move toward the image side during focusing from infinity to a short distance.

Figure 1:
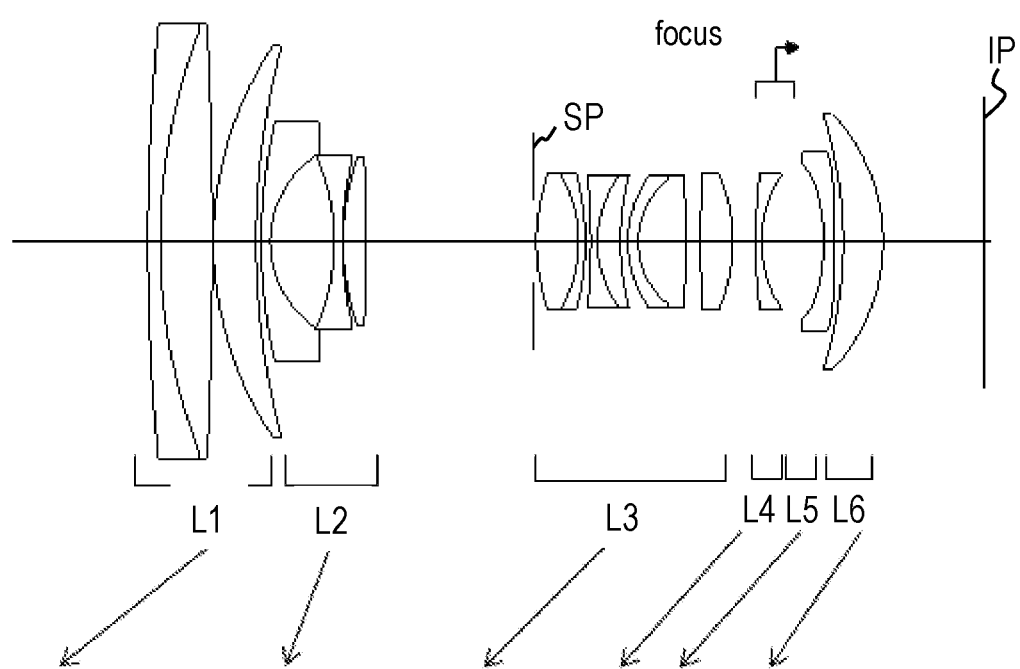
FIG. 1 is a lens cross-sectional view of a zoom lens of Example 1 of the present invention at a wide angle end when an object at infinity is in focus.
Figure 2A:
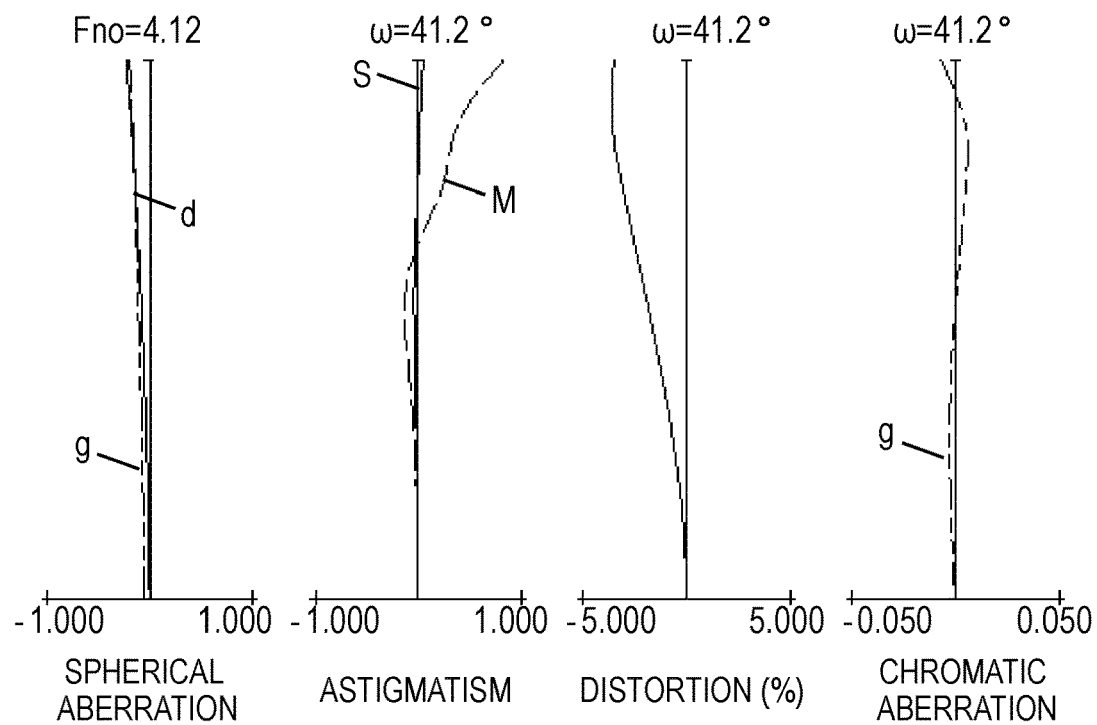
FIG. 2A is aberration diagrams of the zoom lens of Example 1 at the wide angle end when the object at infinity is in focus.
Figure 2B:
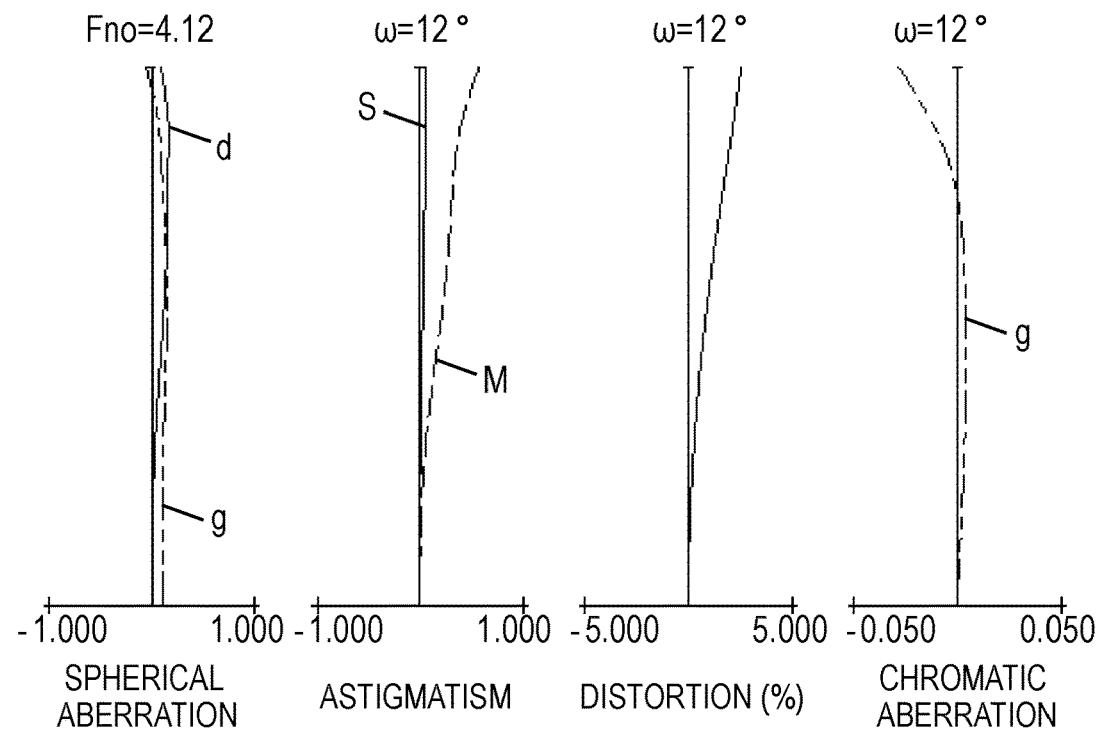
FIG. 2B is aberration diagrams of the zoom lens of Example 1 at a telephoto end when the object at infinity is in focus.

FIG. 1 is a lens cross-sectional view of a zoom lens of Example 1 of the present invention at a wide angle end (short focal length end) when an object at infinity is in focus. FIG. 2A and FIG. 2B are aberration diagrams of the zoom lens of Example 1 at the wide angle end and a telephoto end (long focal length end) when the object at infinity is in focus, respectively. The zoom lens of Example 1 is a zoom lens having a zoom ratio of 4.12 and an F-number of from about 4.12 to about 4.12.

Figure 4A:
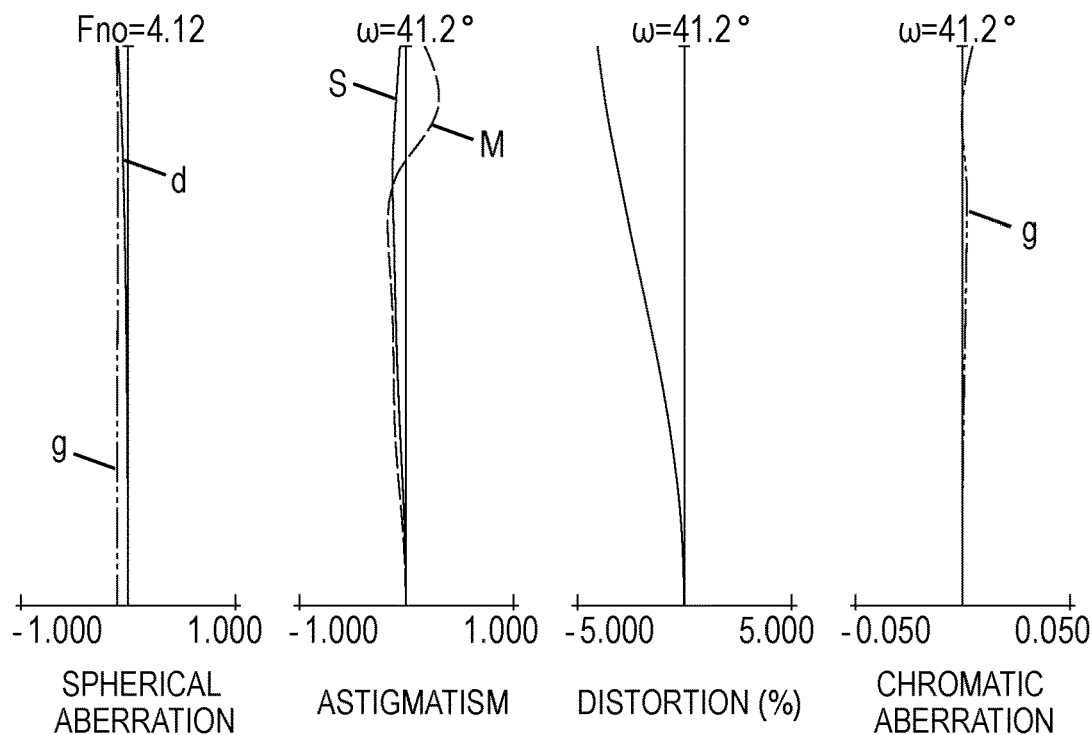
FIG. 4A is aberration diagrams of the zoom lens of Example 2 at the wide angle end when the object at infinity is in focus.
Figure 4B:
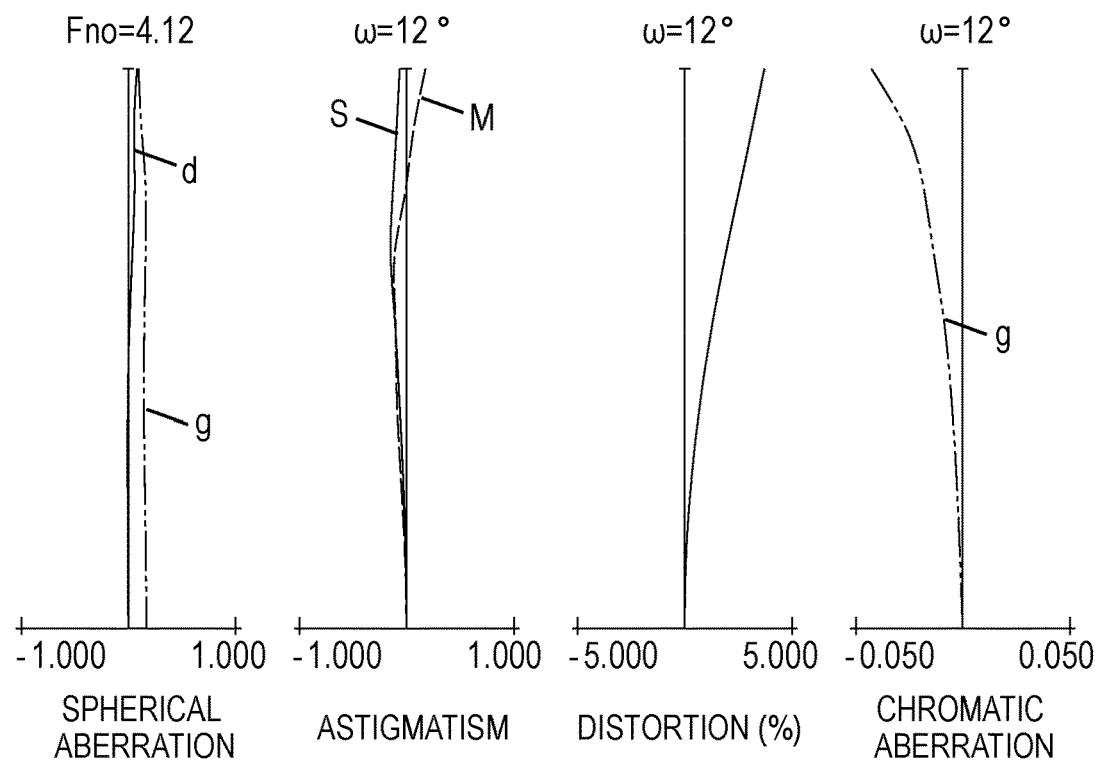
FIG. 4B is aberration diagrams of the zoom lens of Example 2 at a telephoto end when the object at infinity is in focus.

FIG. 3 is a lens cross-sectional view of a zoom lens of Example 2 of the present invention at a wide angle end when an object at infinity is in focus. FIG. 4A and FIG. 4B are aberration diagrams of the zoom lens of Example 2 at the wide angle end and a telephoto end when the object at infinity is in focus, respectively. The zoom lens of Example 2 is a zoom lens having a zoom ratio of 4.12 and an F-number of from about 4.12 to about 4.12.

Figure 5:
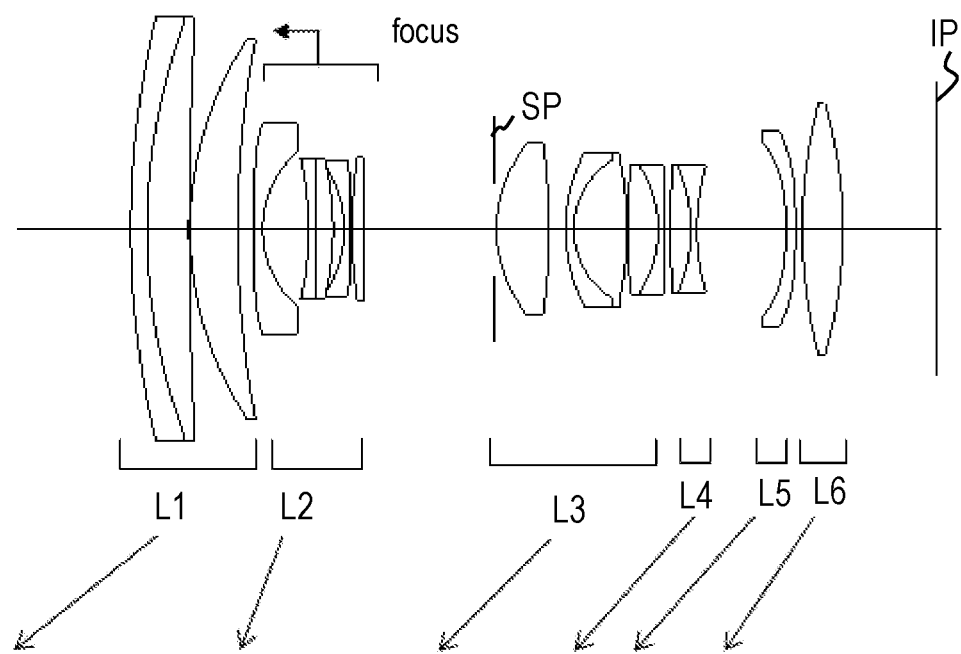
FIG. 5 is a cross-sectional view of a zoom lens of Example 3 of the present invention at a wide angle end when an object at infinity is in focus.
Figure 6A:
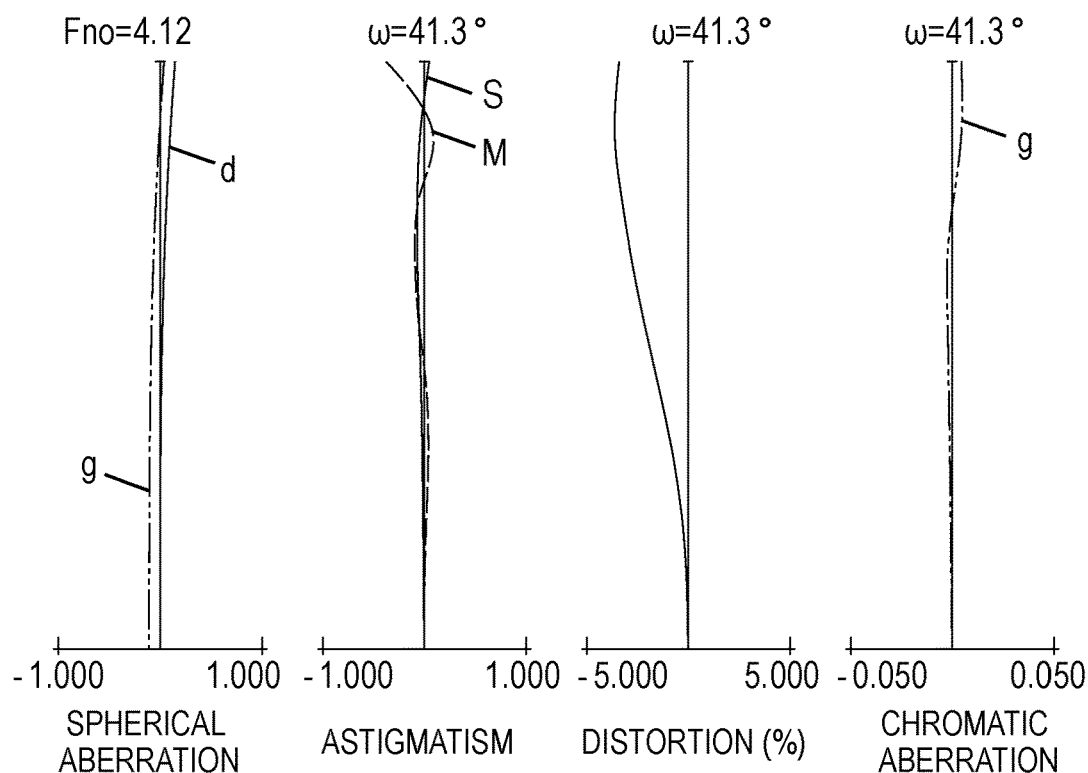
FIG. 6A is aberration diagrams of the zoom lens of Example 3 at the wide angle end when the object at infinity is in focus.
Figure 6B:
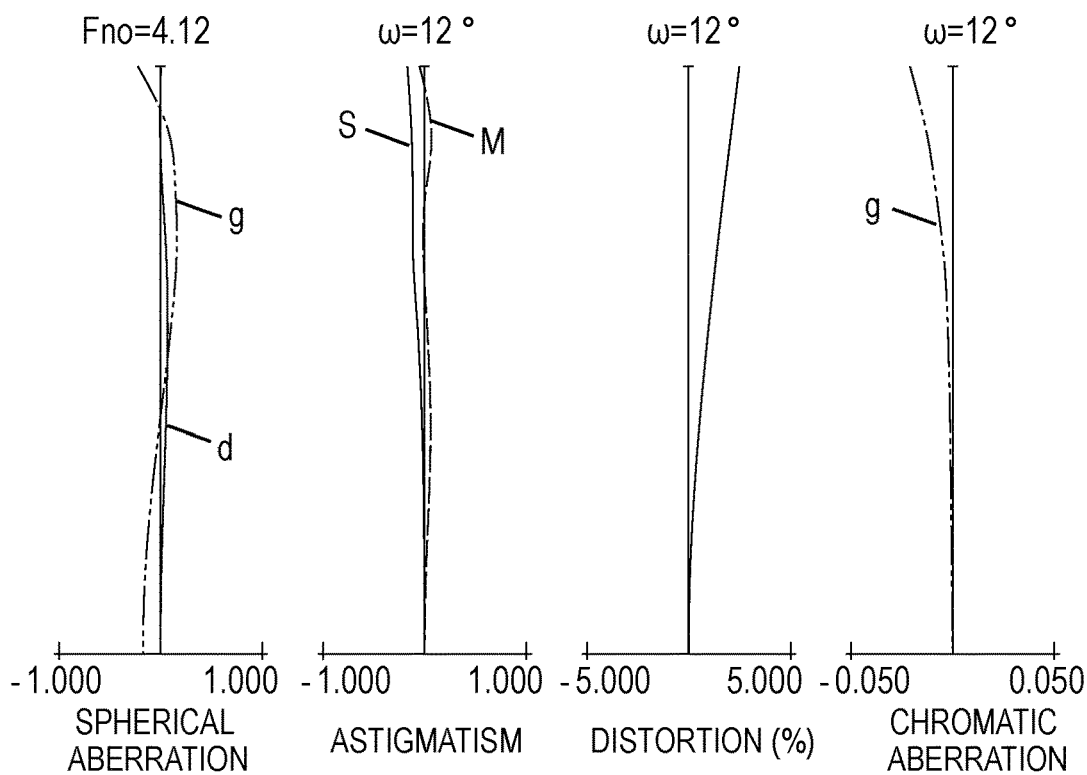
FIG. 6B is aberration diagrams of the zoom lens of Example 3 at a telephoto end when the object at infinity is in focus.

FIG. 5 is a lens cross-sectional view of a zoom lens of Example 3 of the present invention at a wide angle end when an object at infinity is in focus. FIG. 6A and FIG. 6B are aberration diagrams of the zoom lens of Example 3 at the wide angle end and a telephoto end when the object at infinity is in focus, respectively. The zoom lens of Example 3 is a zoom lens having a zoom ratio of 4.15 and an F-number of from about 4.12 to about 4.12.

Figure 7:
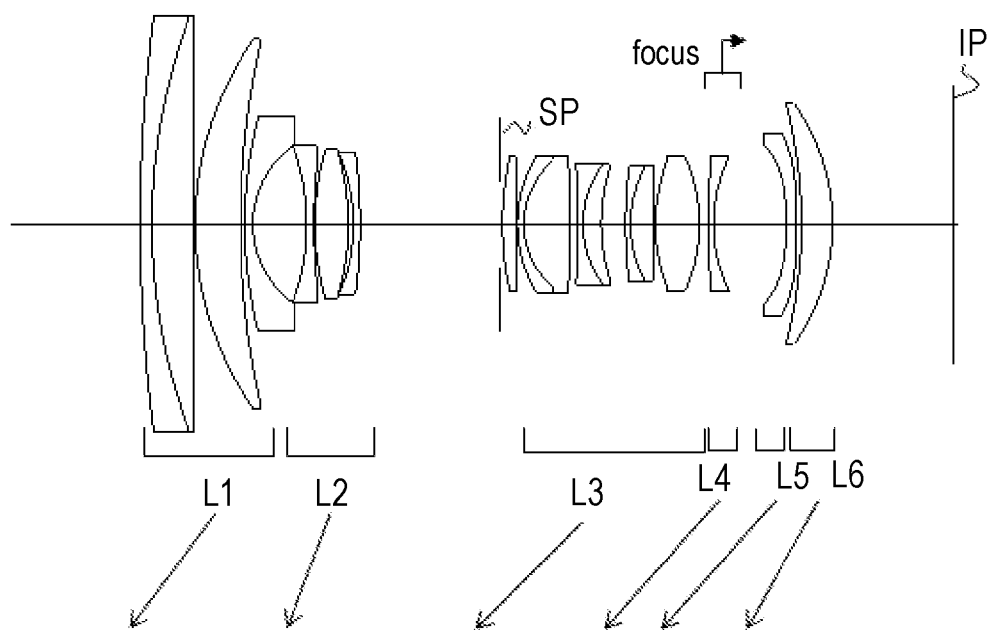
FIG. 7 is a cross-sectional view of a zoom lens of Example 4 of the present invention at a wide angle end when an object at infinity is in focus.
Figure 8A:
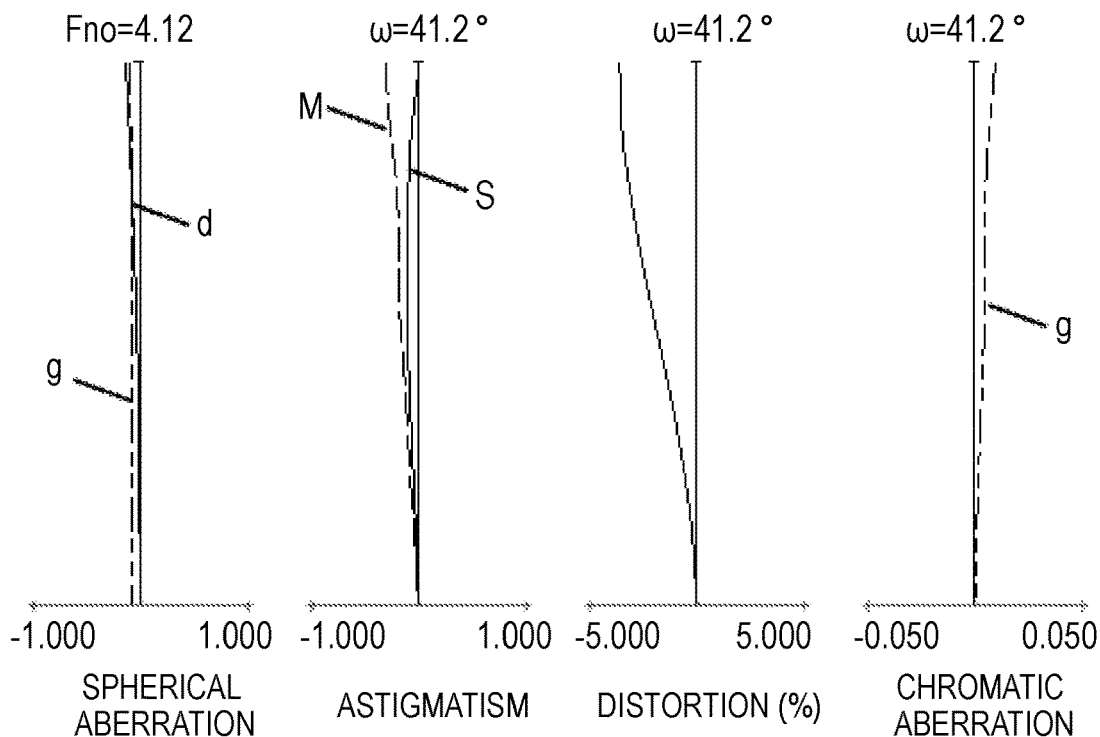
FIG. 8A is aberration diagrams of the zoom lens of Example 4 at the wide angle end when the object at infinity is in focus.
Figure 8B:
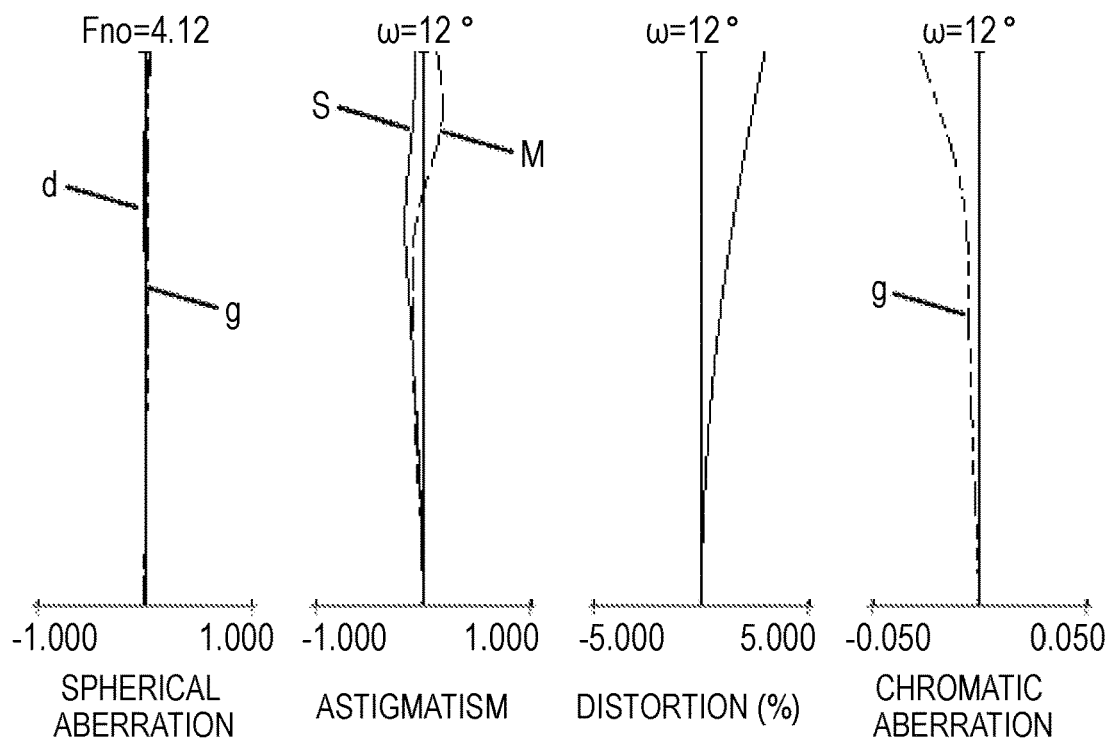
FIG. 8B is aberration diagrams of the zoom lens of Example 4 at a telephoto end when the object at infinity is in focus.

FIG. 7 is a lens cross-sectional view of a zoom lens of Example 4 of the present invention at a wide angle end when an object at infinity is in focus. FIG. 8A and FIG. 8B are aberration diagrams of the zoom lens of Example 4 at the wide angle end and a telephoto end when the object at infinity is in focus, respectively. The zoom lens of Example 4 is a zoom lens having a zoom ratio of 4.12 and an F-number of from about 4.12 to about 4.12.

Figure 9:
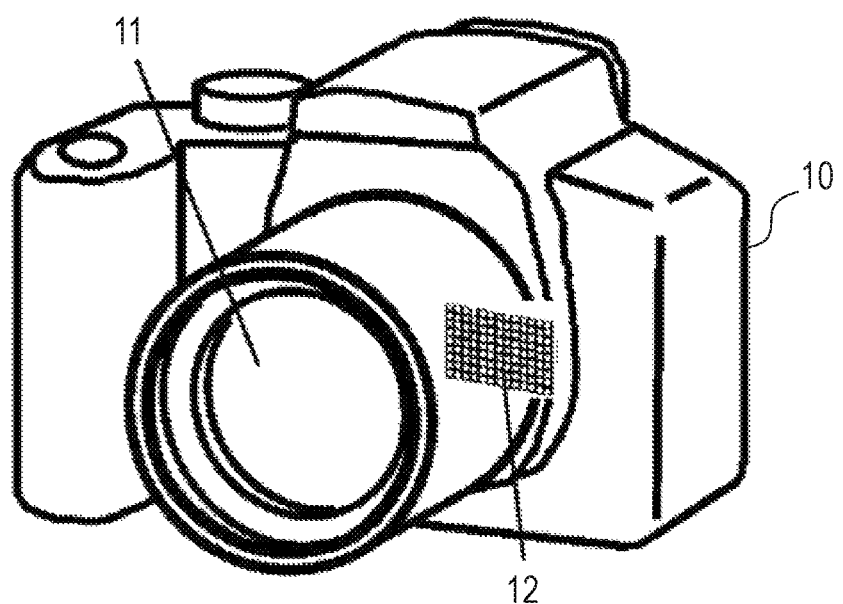
FIG. 9 is a view for illustrating a configuration of an image pickup apparatus according to one embodiment of the present invention.

FIG. 9 is a schematic view of a main part of a digital still camera (image pickup apparatus) including the zoom lens according to one embodiment of the present invention.

The zoom lens of each Example is a zoom lens to be used in image pickup apparatus such as a digital camera, a video camera, a broadcasting camera, a monitoring camera, and a silver-halide film camera. The zoom lens of each Example may also be used as a projection optical system for a projection apparatus (projector).

In the lens cross-sectional views, the left side is the object side (front), and the right side is the image side (rear). Further, in the lens cross-sectional views, when the order of a lens unit from the object side is represented by "i", the i-th lens unit is represented by Li. An aperture stop SP is also illustrated. An image plane IP corresponds to an image pickup surface of a solid-state image pickup element (photoelectric conversion element) such as a CCD sensor or a CMOS sensor when the zoom lens is used in an image pickup apparatus of a digital camera, a video camera, or the like. When the zoom lens is used in an image pickup apparatus of a silver-halide film camera, the image plane IP corresponds to a film surface. Each lens unit is configured to move during zooming from the wide angle end to the telephoto end as indicated by the arrow.

The arrow related to focusing indicates a movement direction of the second lens unit or the fourth lens unit during focusing from infinity to a short distance. In the spherical aberration diagrams, an F-number is represented by Fno. Further, "d" represents a d-line (wavelength: 587.6 nm), and "g" represents a g-line (wavelength: 435.8 nm). In the astigmatism diagrams, M represents a meridional image plane at the d-line, and S represents a sagittal image plane at the d-line. The distortion diagrams are illustrations with respect to the d-line. The lateral chromatic aberration diagrams are illustrations with respect to the g-line. A half angle of view (degree) is represented by "w".

The zoom lens of each Example includes, in order from the object side to the image side: a first lens unit L1 having a positive refractive power; a second lens unit L2 having a negative refractive power; a third lens unit L3 having a positive refractive power; a fourth lens unit L4 having a negative refractive power; a fifth lens unit L5 having a negative refractive power; and a sixth lens unit L6 having a positive refractive power. The second lens unit L2 is configured to move toward the object side or the fourth lens unit L4 is configured to move toward the image side during focusing from the infinity to the short distance.

A focal length of the first lens unit L1 is represented by f1, a focal length of the sixth lens unit L6 is represented by f6, and a back focus at the wide angle end is represented by Skw. The back focus is a distance on an optical axis from a lens surface of the zoom lens that is closest to the object side to the image plane. At this time, the following conditional expressions are satisfied.

$$1.0 < f1/f6 < 1.9 \tag{1}$$

$$4.0 < f1/Skw < 15.0 \tag{2}$$

Next, the technical meanings of the above-mentioned conditional expressions are described. Conditional Expression (1) defines a ratio between the focal length of the first lens unit L1 and the focal length of the sixth lens unit L6. When the ratio exceeds the upper limit value of Conditional Expression (1), the positive refractive power of the lens unit on the object side at the wide angle end is weakened, and the arrangement comes close to the retrofocus-type power arrangement. It thus becomes difficult to correct lateral chromatic aberration and distortion.

Conditional Expression (2) defines a ratio between the back focus and the focal length of the first lens unit L1. When the ratio falls below the lower limit value of Conditional Expression (2), and the back focus becomes excessively longer, the total lens length becomes longer, which is not preferred. It is further preferred to set the numerical ranges of Conditional Expressions (1) and (2) as follows.

$$1.2 < f1/f6 < 1.9 \tag{1a}$$

$$4.5 < f1/Skw < 10.0 \tag{2a}$$

As described above, according to the present invention, it is possible to obtain a small-sized and bright zoom lens in which chromatic aberration, field curvature, and distortion are corrected satisfactorily.

A focal length of the fifth lens unit L5 is represented by f5, and a focal length of the zoom lens at the wide angle end is represented by "fw". A combined focal length of the fourth lens unit L4 and the fifth lens unit L5 at the telephoto end is represented by f45t. A focal length of the zoom lens at the telephoto end is represented by "ft". An open F-number in the entire zoom range exhibited when focused at infinity is represented by Fno. A lateral magnification of the fourth lens unit L4 at the telephoto end is represented by β4t, and a combined lateral magnification of the fifth lens unit L5 and the sixth lens unit L6 at the telephoto end is represented by β56t. At this time, in each Example, it is further preferred to satisfy at least one of the following conditional expressions.

$$-8.0 < f5/fw < -1.5 \tag{3}$$

$$0.20 < |f45t/f6| < 0.50 \tag{4}$$

$$3.0 < ft/fw < 5.0 \tag{5}$$

$$3.9 < Fno < 4.2 \tag{6}$$

$$-8.0 < (1-\beta 4t^2) \times \beta 56t^2 < -2.5 \tag{7}$$

Next, the technical meanings of the above-mentioned conditional expressions are described. Conditional Expression (3) defines a ratio between the focal length of the fifth lens unit L5 and the focal length of the zoom lens at the wide angle end. When the ratio exceeds the upper limit value of Conditional Expression (3), and the negative refractive power of the fifth lens unit L5 becomes excessively stronger, it becomes difficult to correct the field curvature and the distortion. When the ratio falls below the lower limit value of Conditional Expression (3), and the negative refractive power of the fifth lens unit L5 becomes weaker, the back focus becomes longer and the total lens length increases.

Conditional Expression (4) defines a ratio between the combined focal length of the fourth lens unit L4 and the fifth lens unit L5 at the telephoto end and the focal length of the sixth lens unit L6. When the ratio exceeds the upper limit value of Conditional Expression (4), and the combined negative refractive power of the fourth lens unit L4 and the fifth lens unit L5 becomes weaker, the back focus becomes longer and the total lens length increases. When the ratio falls below the lower limit value of Conditional Expression (4), it becomes difficult to obtain a back focus having a predetermined length.

Conditional Expression (5) represents a zoom ratio of the zoom lens. When the zoom ratio exceeds the upper limit value of Conditional Expression (5), it becomes difficult to correct various aberrations and the total lens length increases. When the zoom ratio falls below the lower limit value of Conditional Expression (5), a zoom lens having a high zoom ratio cannot be obtained.

Conditional Expression (6) defines the F-number, which is an aperture ratio of the zoom lens. Through satisfaction of the range of Conditional Expression (6) at the wide angle end and the telephoto end, a bright zoom lens is obtained.

Conditional Expression (7) defines focus sensitivity of the fourth lens unit L4. When the obtained value exceeds the upper limit value of Conditional Expression (7), and the focus sensitivity of the fourth lens unit L4 is weak, an amount of movement of the fourth lens unit L4 increases and the total lens length increases during focusing. When the obtained value falls below the lower limit value of Conditional Expression (7), aberration variation due to focusing increases. It is further preferred to set the numerical ranges of Conditional Expressions (3) to (7) as follows.

$$-5.0 < f5/fw < -1.5 \tag{3a}$$

$$0.25 < |f45t/f6| < 0.48 \tag{4a}$$

$$3.5 < ft/fw < 4.5 \tag{5a}$$

$$4.00 < Fno < 4.18 \tag{6a}$$

$$-6.0 < (1-\beta 4t^2) \times \beta 56t^2 < -2.6 \tag{7a}$$

In each Example, the sixth lens unit L6 has a positive refractive power. In each Example, the fourth lens unit L4 is formed of a single negative lens or a cemented lens formed by cementing a positive lens and a negative lens. The fifth lens unit L5 is formed of a single negative lens. The sixth lens unit L6 is formed of a single positive lens. By forming each lens unit in this manner, high optical performance is obtained over the entire zoom range and the entire object distance.

Next, a digital still camera (image pickup apparatus) according to one embodiment of the present invention, in which the zoom lens according to one embodiment of the present invention is used as an image pickup optical system, is described with reference to FIG. 9. In FIG. 9, a camera body 10 and an image pickup optical system 11 formed of the zoom lens according to one embodiment of the present invention are illustrated. A solid-state image pickup element (photoelectric conversion element) 12 such as a CCD sensor or a CMOS sensor is mounted in the camera body 10 and configured to receive light of an object image formed by the image pickup optical system 11.

The present invention is also applicable to a single lens reflex (SLR) camera without a quick return mirror. Further, the zoom lens according to one embodiment of the present invention is also applicable to a video camera.

Specific numerical data of Numerical Examples 1 to 4 corresponding to Examples 1 to 4 is described below. In each Numerical Example, "i" indicates the order from the object side, "ri" indicates the curvature radius of an i-th optical surface (i-th surface), "di" indicates an on-axis interval between the i-th surface and an (i+1)-th surface, and "ndi" and "vdi" indicate the refractive index and Abbe number of a material of an optical member between the i-th surface and the (i+1)-th surface with respect to the d-line, respectively. An aspherical shape is expressed by the following expression.

$$X = \frac{H^2/R}{1+\sqrt{1-(1+K)(H/R)^2}} + A4H^4 + A6H^6 + A8H^8 + A10H^{10} + A12H^{12}$$

In this expression, the X-axis represents an optical axis direction, the H-axis represents an axis in a direction perpendicular to the optical axis, a traveling direction of light is positive, R represents a paraxial curvature radius, K represents a conic constant, and A4, A6, A8, A10, and A12 represent aspherical coefficients.

The asterisk (*) indicates a surface having an aspherical shape. The notation "e-x" indicates $10^{-x}$. The notation "BF" indicates an air-equivalent back focus. The total lens length is a value obtained by adding the back focus BF to a distance from the first lens surface to the last lens surface. Moreover, a relationship between the conditional expressions given above and Examples is shown in Table 1. Further, a relationship between parameters relating to Conditional Expressions (4) and (7) and each Example is shown in Table 2.

[Numerical Data 1]

Unit: mm

Surface data

| Surface number | r | d | nd | vd | Effective diameter |
|---|---|---|---|---|---|
| 1 | 339.483 | 1.80 | 1.84666 | 23.8 | 63.00 |
| 2 | 87.145 | 7.69 | 1.62041 | 60.3 | 61.18 |
| 3 | −624.764 | 0.15 | | | 60.83 |
| 4 | 52.013 | 6.24 | 1.88300 | 40.8 | 56.45 |
| 5 | 112.523 | (Variable) | | | 55.32 |
| 6 | 80.275 | 1.30 | 1.78800 | 47.4 | 34.27 |
| 7 | 15.364 | 9.41 | | | 24.94 |
| 8* | −33.088 | 1.20 | 1.58313 | 59.4 | 24.44 |
| 9* | 47.832 | 0.15 | | | 23.57 |
| 10 | 39.145 | 3.14 | 2.00069 | 25.5 | 23.56 |
| 11 | −890.879 | (Variable) | | | 23.16 |
| 12 (Stop) | ∞ | 0.50 | | | 18.02 |
| 13* | 29.739 | 6.19 | 1.58313 | 59.4 | 18.65 |
| 14 | −20.067 | 1.00 | 1.75520 | 27.5 | 18.61 |
| 15 | −38.858 | 0.79 | | | 18.80 |
| 16 | −98.143 | 1.00 | 1.73800 | 32.3 | 18.45 |
| 17 | 16.483 | 3.35 | 1.89286 | 20.4 | 18.25 |
| 18 | 37.162 | 1.13 | | | 18.00 |
| 19 | 16.923 | 1.50 | 2.00100 | 29.1 | 18.44 |
| 20 | 11.876 | 7.12 | 1.49700 | 81.5 | 17.12 |
| 21 | −73.034 | 2.00 | | | 16.83 |
| 22* | 109.320 | 4.76 | 1.58313 | 59.4 | 17.92 |
| 23 | −25.798 | (Variable) | | | 18.79 |
| 24 | 87.761 | 0.80 | 1.56732 | 42.8 | 19.00 |
| 25 | 17.946 | (Variable) | | | 18.83 |
| 26* | −31.997 | 1.50 | 1.76802 | 49.2 | 21.66 |
| 27* | −10,000.000 | (Variable) | | | 25.18 |
| 28 | −61.917 | 5.89 | 1.81600 | 46.6 | 35.22 |
| 29 | −27.575 | (Variable) | | | 36.50 |
| Image plane | ∞ | | | | |

Aspherical surface data

Eighth surface

K = 0.00000e+000  A4 = −1.07293e−005  A6 = 7.06133e−008
A8 = −7.04553e−010  A10 = 2.50833e−012

Ninth surface

K = 0.00000e+000  A4 = −1.43391e−005  A6 = 7.34660e−008
A8 = −5.40137e−010  A10 = 2.12706e−012

Thirteenth surface

K = 0.00000e+000  A4 = −9.82631e−006  A6 = −5.07372e−008
A8 = 9.20885e−010  A10 = −8.83478e−012  A12 = 3.26540e−014

Twenty-second surface

K = 0.00000e+000  A4 = −3.94253e−005  A6 = 4.82728e−008
A8 = −3.57812e−010  A10 = 6.93834e−012

Twenty-sixth surface

K = 0.00000e+000  A4 = −2.24578e−005  A6 = −1.72773e−007
A8 = 7.49384e−010  A10 = −1.99499e−011  A12 = 5.77107e−014

Twenty-seventh surface

K = 0.00000e+000  A4 = −1.46228e−005  A6 = −9.50388e−008
A8 = −6.26827e−011  A10 = −1.66056e−012  A12 = 1.10419e−014

-continued

Unit: mm

Various data
Zoom ratio 4.12

| | Wide angle | Intermediate | Telephoto |
|---|---|---|---|
| Focal length | 24.72 | 49.85 | 101.86 |
| F-number | 4.12 | 4.12 | 4.12 |
| Half angle of view | 41.19 | 23.46 | 11.99 |
| Image height | 21.64 | 21.64 | 21.64 |
| Total lens length | 122.96 | 139.43 | 164.86 |
| BF | 14.91 | 17.39 | 28.62 |
| d5 | 0.80 | 16.87 | 37.67 |
| d11 | 24.71 | 11.86 | 2.38 |
| d23 | 3.41 | 3.44 | 1.44 |
| d25 | 9.17 | 9.14 | 11.14 |
| d27 | 1.35 | 12.12 | 15.00 |
| d29 | 14.91 | 17.39 | 28.62 |
| Entrance pupil position | 31.25 | 59.28 | 123.60 |
| Exit pupil position | −44.61 | −100.01 | −132.20 |
| Front principal point position | 45.70 | 87.97 | 160.94 |
| Rear principal point position | −9.81 | −32.46 | −73.23 |

Zoom lens unit data

| Unit | First surface | Focal length | Lens structure length | Front principal point position | Rear principal point position |
|---|---|---|---|---|---|
| 1 | 1 | 95.52 | 15.87 | 3.20 | −5.84 |
| 2 | 6 | −22.58 | 15.21 | 1.12 | −11.61 |
| 3 | 12 | 22.26 | 29.34 | 13.90 | −11.66 |
| 4 | 24 | −39.93 | 0.80 | 0.64 | 0.13 |
| 5 | 26 | −41.80 | 1.50 | −0.00 | −0.85 |
| 6 | 28 | 56.57 | 5.89 | 5.43 | 2.42 |

[Numerical Data 2]

Unit: mm

Surface data

| Surface number | r | d | nd | vd | Effective diameter |
|---|---|---|---|---|---|
| 1 | 360.812 | 1.80 | 1.84666 | 23.8 | 62.80 |
| 2 | 102.577 | 6.64 | 1.72916 | 54.7 | 60.93 |
| 3 | −772.618 | 0.15 | | | 60.54 |
| 4 | 54.305 | 6.51 | 1.72916 | 54.7 | 55.83 |
| 5 | 145.050 | (Variable) | | | 54.70 |
| 6* | 195.122 | 1.80 | 1.76802 | 49.2 | 36.16 |
| 7 | 15.928 | 10.58 | | | 25.29 |
| 8 | −25.140 | 0.90 | 1.49700 | 81.5 | 23.93 |
| 9 | −208.718 | 0.15 | | | 23.27 |
| 10 | 47.367 | 2.32 | 1.89286 | 20.4 | 22.65 |
| 11 | 190.240 | (Variable) | | | 22.14 |
| 12 (Stop) | ∞ | 0.50 | | | 18.72 |
| 13 | 18.368 | 0.80 | 1.88300 | 40.8 | 20.01 |
| 14 | 13.125 | 7.95 | 1.58313 | 59.4 | 19.19 |
| 15* | −57.788 | 0.99 | | | 18.82 |
| 16 | −87.965 | 0.80 | 1.76200 | 40.1 | 18.45 |
| 17 | 16.252 | 3.22 | 2.00069 | 25.5 | 18.08 |
| 18 | 34.593 | 1.40 | | | 17.70 |
| 19 | 15.903 | 0.80 | 2.00100 | 29.1 | 17.88 |
| 20 | 11.311 | 6.81 | 1.53775 | 74.7 | 16.78 |
| 21 | 6,552.763 | 0.15 | | | 16.11 |
| 22 | 39.790 | 0.80 | 1.85478 | 24.8 | 15.80 |
| 23 | 19.824 | 4.52 | 1.58313 | 59.4 | 15.92 |
| 24* | −36.018 | (Variable) | | | 16.42 |
| 25 | 64.857 | 0.80 | 1.57250 | 57.7 | 17.03 |
| 26 | 16.869 | (Variable) | | | 17.11 |
| 27* | −20.265 | 1.50 | 1.58313 | 59.4 | 22.44 |
| 28* | −77.916 | (Variable) | | | 27.23 |
| 29 | −98.804 | 5.29 | 1.88300 | 40.8 | 35.44 |
| 30 | −34.131 | (Variable) | | | 36.52 |

-continued

Unit: mm

Image plane ∞

Aspherical surface data

Sixth surface

K = 0.00000e+000    A4 = 7.28875e-006    A6 = -2.03079e-008
A8 = 6.78458e-011   A10 = -1.61143e-013  A12 = 1.59482e-016

Fifteenth surface

K = 0.00000e+000    A4 = 2.25823e-005    A6 = -4.01819e-008
A8 = -1.92298e-010  A10 = 3.85842e-013

Twenty-fourth surface

K = 0.00000e+000    A4 = 4.03627e-005    A6 = 2.28646e-008
A8 = 1.73530e-010   A10 = -8.03393e-012

Twenty-seventh surface

K = 0.00000e+000    A4 = -9.10759e-006   A6 = -3.96094e-007
A8 = 1.03168e-009   A10 = 4.30404e-012   A12 = -1.28909e-013

Twenty-eighth surface

K = 0.00000e+000    A4 = -1.23220e-005   A6 = -2.88150e-007
A8 = 2.01026e-009   A10 = -1.01180e-011  A12 = 1.58725e-014

Various data
Zoom ratio 4.12

| | Wide angle | Intermediate | Telephoto |
|---|---|---|---|
| Focal length | 24.72 | 57.08 | 101.89 |
| F-number | 4.12 | 4.12 | 4.12 |
| Half angle of view | 41.19 | 20.76 | 11.99 |
| Image height | 21.64 | 21.64 | 21.64 |
| Total lens length | 120.52 | 140.11 | 159.71 |
| BF | 13.52 | 18.44 | 26.90 |
| d5 | 0.70 | 18.51 | 35.81 |
| d11 | 24.20 | 9.43 | 2.38 |
| d24 | 1.58 | 2.26 | 0.96 |
| d26 | 12.56 | 11.89 | 13.18 |
| d28 | 0.78 | 12.42 | 13.30 |
| d30 | 13.52 | 18.44 | 26.90 |
| Entrance pupil position | 30.66 | 63.26 | 120.42 |
| Exit pupil position | -42.66 | -98.88 | -108.83 |
| Front principal point position | 44.50 | 92.57 | 145.83 |
| Rear principal point position | -11.20 | -38.64 | -74.99 |

Zoom lens unit data

| Unit | First surface | Focal length | Lens structure length | Front principal point position | Rear principal point position |
|---|---|---|---|---|---|
| 1 | 1 | 92.83 | 15.10 | 2.56 | -6.07 |
| 2 | 6 | -20.76 | 15.75 | 1.63 | -11.76 |
| 3 | 12 | 22.08 | 28.73 | 10.33 | -13.15 |
| 4 | 25 | -40.07 | 0.80 | 0.69 | 0.18 |
| 5 | 27 | -47.42 | 1.50 | -0.34 | -1.29 |
| 6 | 29 | 56.87 | 5.29 | 4.14 | 1.43 |

[Numerical Data 3]

Unit: mm

Surface data

| Surface number | r | d | nd | vd | Effective diameter |
|---|---|---|---|---|---|
| 1 | 133.283 | 2.40 | 1.85478 | 24.8 | 61.17 |
| 2 | 87.083 | 6.17 | 1.49700 | 81.5 | 59.23 |
| 3 | 550.059 | 0.15 | | | 58.48 |
| 4 | 50.802 | 6.98 | 1.59522 | 67.7 | 54.57 |
| 5 | 146.905 | (Variable) | | | 53.53 |
| 6* | ∞ | 1.30 | 1.77250 | 49.6 | 29.88 |
| 7* | 15.549 | 6.71 | | | 21.52 |
| 8* | -52.935 | 1.00 | 1.77250 | 49.6 | 19.54 |
| 9 | 237.079 | 2.65 | 1.84666 | 23.8 | 18.53 |
| 10 | -42.980 | 1.61 | | | 17.85 |
| 11 | -17.616 | 1.00 | 1.59522 | 67.7 | 17.58 |
| 12 | -134.606 | 0.15 | | | 18.80 |
| 13 | 72.524 | 1.92 | 1.90366 | 31.3 | 19.76 |
| 14 | -1,276.143 | (Variable) | | | 20.15 |
| 15 (Stop) | ∞ | 0.30 | | | 21.43 |
| 16* | 18.428 | 7.79 | 1.58313 | 59.4 | 24.19 |
| 17* | -73.149 | 2.42 | | | 23.67 |
| 18 | 24.754 | 1.20 | 1.90366 | 31.3 | 21.44 |
| 19 | 11.941 | 7.84 | 1.49700 | 81.5 | 19.12 |
| 20 | -51.310 | 0.15 | | | 18.64 |
| 21 | 126.267 | 4.45 | 1.49700 | 81.5 | 17.93 |
| 22 | -17.021 | 1.00 | 1.61772 | 49.8 | 17.20 |
| 23 | -211.188 | (Variable) | | | 16.38 |
| 24 | 144.617 | 3.00 | 1.84666 | 23.8 | 17.29 |
| 25 | -23.508 | 0.90 | 1.91082 | 35.3 | 17.35 |
| 26 | 33.323 | (Variable) | | | 17.65 |
| 27* | -80.320 | 1.40 | 1.85400 | 40.4 | 24.77 |
| 28* | ∞ | (Variable) | | | 27.50 |
| 29 | 72.323 | 5.97 | 1.58267 | 46.4 | 35.59 |
| 30 | -66.523 | (Variable) | | | 36.03 |
| Image plane | ∞ | | | | |

Aspherical surface data

Sixth surface

K = 0.00000e+000    A4 = 1.93701e-005    A6 = 2.31122e-008
A8 = -1.67313e-010  A10 = 4.40103e-013

Seventh surface

K = 0.00000e+000    A4 = -8.36603e-006   A6 = 1.58424e-007
A8 = -1.01097e-009  A10 = 7.41530e-012

Eighth surface

K = 0.00000e+000    A4 = -9.92583e-006   A6 = 1.32318e-008
A8 = -2.07092e-010

Sixteenth surface

K = 0.00000e+000    A4 = -1.53495e-005   A6 = -2.84937e-008
A8 = 3.60916e-011   A10 = -4.00620e-013

Seventeenth surface

K = 0.00000e+000    A4 = 1.35491e-005    A6 = -1.60301e-008
A8 = 2.06878e-011

Twenty-seventh surface

K = 0.00000e+000    A4 = -1.59541e-004   A6 = 7.20505e-007
A8 = -1.74745e-009  A10 = 8.78750e-014

Twenty-eighth surface

K = 0.00000e+000    A4 = -1.36842e-004   A6 = 7.55431e-007
A8 = -2.16732e-009  A10 = 2.27327e-012

Various data
Zoom ratio 4.15

| | Wide angle | Intermediate | Telephoto |
|---|---|---|---|
| Focal length | 24.60 | 50.00 | 102.00 |
| F-number | 4.12 | 4.12 | 4.12 |
| Half angle of view | 41.33 | 23.40 | 11.98 |
| Image height | 21.64 | 21.64 | 21.64 |
| Total lens length | 118.48 | 129.70 | 168.47 |
| BF | 13.64 | 31.35 | 30.10 |
| d5 | 2.44 | 9.30 | 41.41 |
| d14 | 19.03 | 5.67 | 2.00 |
| d23 | 0.80 | 7.57 | 9.20 |
| d26 | 13.11 | 6.34 | 4.71 |
| d28 | 1.00 | 1.00 | 12.58 |
| d30 | 13.64 | 31.35 | 30.10 |

-continued

| Unit: mm | | | |
|---|---|---|---|
| Entrance pupil position | 30.45 | 38.18 | 128.02 |
| Exit pupil position | −44.11 | −37.12 | −75.32 |
| Front principal point position | 44.58 | 51.66 | 131.33 |
| Rear principal point position | −10.96 | −18.65 | −71.90 |

Zoom lens unit data

| Unit | First surface | Focal length | Lens structure length | Front principal point position | Rear principal point position |
|---|---|---|---|---|---|
| 1 | 1 | 108.61 | 15.70 | 1.72 | −8.13 |
| 2 | 6 | −15.78 | 16.33 | 1.86 | −10.57 |
| 3 | 15 | 21.37 | 25.16 | 3.59 | −14.68 |
| 4 | 24 | −41.87 | 3.90 | 2.59 | 0.46 |
| 5 | 27 | −94.05 | 1.40 | −0.00 | −0.76 |
| 6 | 29 | 60.43 | 5.97 | 2.00 | −1.84 |

[Numerical Data 4]

Unit: mm

Surface data

| Surface number | r | d | nd | vd | Effective diameter |
|---|---|---|---|---|---|
| 1 | 247.511 | 1.80 | 1.80810 | 22.8 | 63.00 |
| 2 | 91.971 | 6.53 | 1.72916 | 54.7 | 61.28 |
| 3 | 6789.826 | 0.15 | | | 60.84 |
| 4 | 49.729 | 6.97 | 1.72916 | 54.7 | 55.88 |
| 5 | 125.781 | (Variable) | | | 54.66 |
| 6 | 67.165 | 1.25 | 1.95375 | 32.3 | 31.84 |
| 7 | 15.126 | 8.30 | | | 23.70 |
| 8* | −34.796 | 1.10 | 1.58313 | 59.4 | 23.15 |
| 9* | 76.645 | 0.15 | | | 22.28 |
| 10 | 41.877 | 5.12 | 1.80810 | 22.8 | 21.93 |
| 11 | −38.453 | 0.88 | | | 20.99 |
| 12 | −25.711 | 1.00 | 1.80400 | 46.6 | 20.68 |
| 13 | −84.353 | (Variable) | | | 20.08 |
| 14 (Stop) | ∞ | 0.30 | | | 19.20 |
| 15 | 48.681 | 2.23 | 1.91082 | 35.3 | 19.76 |
| 16 | −877.673 | 0.15 | | | 19.78 |
| 17 | 20.643 | 1.00 | 1.95375 | 32.3 | 19.81 |
| 18 | 12.996 | 6.97 | 1.59522 | 67.7 | 18.60 |
| 19 | −857.036 | 1.33 | | | 17.95 |
| 20 | −169.496 | 0.80 | 1.74951 | 35.3 | 17.54 |
| 21 | 15.672 | 2.80 | 2.00069 | 25.5 | 16.99 |
| 22 | 29.419 | 3.79 | | | 16.56 |
| 23 | 77.230 | 0.75 | 1.78472 | 25.7 | 16.56 |
| 24 | 18.773 | 3.61 | 1.49700 | 81.5 | 16.35 |
| 25 | −856.795 | 0.15 | | | 16.47 |
| 26* | 23.865 | 6.85 | 1.58313 | 59.4 | 18.33 |
| 27* | −24.974 | (Variable) | | | 19.46 |
| 28 | 163.393 | 0.75 | 1.72916 | 54.7 | 19.64 |
| 29 | 23.580 | (Variable) | | | 19.58 |
| 30* | −47.372 | 1.50 | 1.76802 | 49.2 | 23.92 |
| 31* | −615.292 | (Variable) | | | 26.85 |
| 32 | −73.877 | 4.74 | 1.80400 | 46.6 | 35.09 |
| 33 | −32.318 | (Variable) | | | 36.01 |
| Image plane | ∞ | | | | |

Aspherical surface data

Eighth surface

K = 0.00000e+000    A4 = 5.44309e−006    A6 = −7.81877e−008
A8 = 4.09833e−010    A10 = −3.15614e−012    A12 = 1.13264e−014

Ninth surface

K = 0.00000e+000    A4 = −7.87376e−006    A6 = −6.58579e−008

Twenty-sixth surface

K = 0.00000e+000    A4 = −3.16553e−005    A6 = 1.40135e−008

A8 = −8.75482e−010    A10 = 2.78385e−012

Twenty-seventh surface

K = 0.00000e+000    A4 = 1.27650e−005    A6 = −5.00772e−008
A8 = −4.02706e−010    A10 = 5.82883e−013

Thirtieth surface

K = 0.00000e+000    A4 = −1.02030e−004    A6 = 2.87476e−007
A8 = −6.77352e−010    A10 = −6.14238e−012    A12 = 2.82175e−014

Thirty-first surface

K = 0.00000e+000    A4 = −9.26945e−005    A6 = 4.17996e−007
A8 = −1.82148e−009    A10 = 4.35626e−012    A12 = −4.04031e−015

Various data
Zoom ratio 4.12

| | Wide angle | Intermediate | Telephoto |
|---|---|---|---|
| Focal length | 24.72 | 49.56 | 101.84 |
| F-number | 4.12 | 4.12 | 4.12 |
| Half angle of view | 41.19 | 23.59 | 11.99 |
| Image height | 21.64 | 21.64 | 21.64 |
| Total lens length | 125.39 | 142.55 | 169.39 |
| BF | 18.61 | 21.13 | 32.79 |
| d5 | 0.70 | 14.98 | 33.92 |
| d13 | 21.60 | 9.79 | 2.38 |
| d27 | 1.40 | 2.83 | 1.40 |
| d29 | 11.31 | 9.88 | 11.31 |
| d31 | 0.80 | 12.98 | 16.63 |
| d33 | 18.61 | 21.13 | 32.79 |
| Entrance pupil position | 29.57 | 56.09 | 121.86 |
| Exit pupil position | −49.07 | −99.96 | −130.87 |
| Front principal point position | 45.26 | 85.37 | 160.33 |
| Rear principal point position | −6.11 | −28.42 | −69.05 |

Zoom lens unit data

| Unit | First surface | Focal length | Lens structure length | Front principal point position | Rear principal point position |
|---|---|---|---|---|---|
| 1 | 1 | 87.35 | 15.45 | 1.80 | −7.01 |
| 2 | 6 | −17.95 | 17.80 | 1.66 | −11.96 |
| 3 | 14 | 23.68 | 30.74 | 15.66 | −16.19 |
| 4 | 28 | −37.88 | 0.75 | 0.51 | 0.07 |
| 5 | 30 | −66.90 | 1.50 | −0.07 | −0.92 |
| 6 | 32 | 68.00 | 4.74 | 4.44 | 1.94 |

TABLE 1

| | (1) | (2) | (3) | (4) | (5) | (6) | (7) |
|---|---|---|---|---|---|---|---|
| Example 1 | 1.69 | 6.40 | −1.69 | 0.32 | 4.12 | 4.12 | −5.65 |
| Example 2 | 1.63 | 6.87 | −1.92 | 0.33 | 4.12 | 4.12 | −5.15 |
| Example 3 | 1.80 | 7.96 | −3.82 | 0.46 | 4.15 | 4.12 | −2.87 |
| Example 4 | 1.28 | 4.69 | −2.72 | 0.32 | 4.12 | 4.12 | −5.71 |

TABLE 2

| | f45t | β4t | β56t |
|---|---|---|---|
| Example 1 | −18.00 | 1.93 | 1.44 |
| Example 2 | −18.97 | 2.00 | 1.31 |
| Example 3 | −28.10 | 2.15 | 0.89 |
| Example 4 | −21.86 | 2.25 | 1.19 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-109743, filed Jun. 2, 2017, which is hereby incorporated by reference herein in its entirety.

What is claimed is:

1. A zoom lens, comprising, in order from an object side to an image side:
   a first lens unit having a positive refractive power;
   a second lens unit having a negative refractive power;
   a third lens unit having a positive refractive power;
   a fourth lens unit having a negative refractive power;
   a fifth lens unit having a negative refractive power; and
   a sixth lens unit having a positive refractive power,
   wherein an interval between the first lens unit and the second lens unit, an interval between the second lens unit and the third lens unit, an interval between the third lens unit and the fourth lens unit, an interval between the fourth lens unit and the fifth lens unit and an interval between the fifth lens unit and the sixth lens unit are changed during zooming,
   wherein the first lens unit is configured to move toward the object side during zooming from a wide angle end to a telephoto end, and
   wherein the following conditional expressions are satisfied:

$1.0 < f1/f6 \leq 1.80$, $4.0 < f1/Skw < 15.0$, $0.32 \leq |f45t/f6| < 0.50$, $-8.0 < (1-\beta 4t^2) \times \beta 56t^2 \leq -2.87$, where f1 represents a focal length of the first lens unit, f6 represents a focal length of the sixth lens unit, Skw represents a back focus at the wide angle end, f45t represents a combined focal length of the fourth lens unit and the fifth lens unit at the telephoto end, $\beta 4t$ represents a lateral magnification of the fourth lens unit at the telephoto end, and $\beta 56t$ represents a combined lateral magnification of the fifth lens unit and the sixth lens unit at the telephoto end.

2. A zoom lens according to claim 1, wherein the following conditional expression is satisfied:

$-8.0 < f5/fw < -1.5$, where f5 represents a focal length of the fifth lens unit, and fw represents a focal length of the zoom lens at the wide angle end.

3. A zoom lens according to claim 1, wherein the following conditional expression is satisfied:

$3.0 < ft/fw < 5.0$, where "ft" represents a focal length of the zoom lens at the telephoto end, and "fw" represents a focal length of the zoom lens at the wide angle end.

4. A zoom lens according to claim 1, wherein the following conditional expression is satisfied:

$3.9 < Fno < 4.2$, where Fno represents an open F-number exhibited when focused at infinity.

5. A zoom lens according to claim 1, wherein the fourth lens unit is configured to move toward the image side during focusing from infinity to a short distance.

6. A zoom lens according to claim 1, wherein the second lens unit is configured to move toward the object side during focusing from infinity to a short distance.

7. An image pickup apparatus, comprising:
   a zoom lens; and
   an image pickup element configured to receive light of an image formed by the zoom lens,
   wherein the zoom lens includes, in order from an object side to an image side:
      a first lens unit having a positive refractive power;
      a second lens unit having a negative refractive power;
      a third lens unit having a positive refractive power;
      a fourth lens unit having a negative refractive power;
      a fifth lens unit having a negative refractive power; and
      a sixth lens unit having a positive refractive power,
   wherein an interval between the first lens unit and the second lens unit, an interval between the second lens unit and the third lens unit, an interval between the third lens unit and the fourth lens unit, an interval between the fourth lens unit and the fifth lens unit and an interval between the fifth lens unit and the sixth lens unit are changed during zooming,
   wherein the first lens unit is configured to move toward the object side during zooming from a wide angle end to a telephoto end, and
   wherein the following conditional expressions are satisfied:

$1.0 < f1/f6 \leq 1.80$, $4.0 < f1/Skw < 15.0$, $0.32 \leq |f45t/f6| < 0.50$, $-8.0 < (1-\beta 4t^2) \times \beta 56t^2 \leq -2.87$, where f1 represents a focal length of the first lens unit, f6 represents a focal length of the sixth lens unit, Skw represents a back focus at the wide angle end, f45t represents a combined focal length of the fourth lens unit and the fifth lens unit at the telephoto end, $\beta 4t$ represents a lateral magnification of the fourth lens unit at the telephoto end, and $\beta 56t$ represents a combined lateral magnification of the fifth lens unit and the sixth lens unit at the telephoto end.

* * * * *